United States Patent Office.

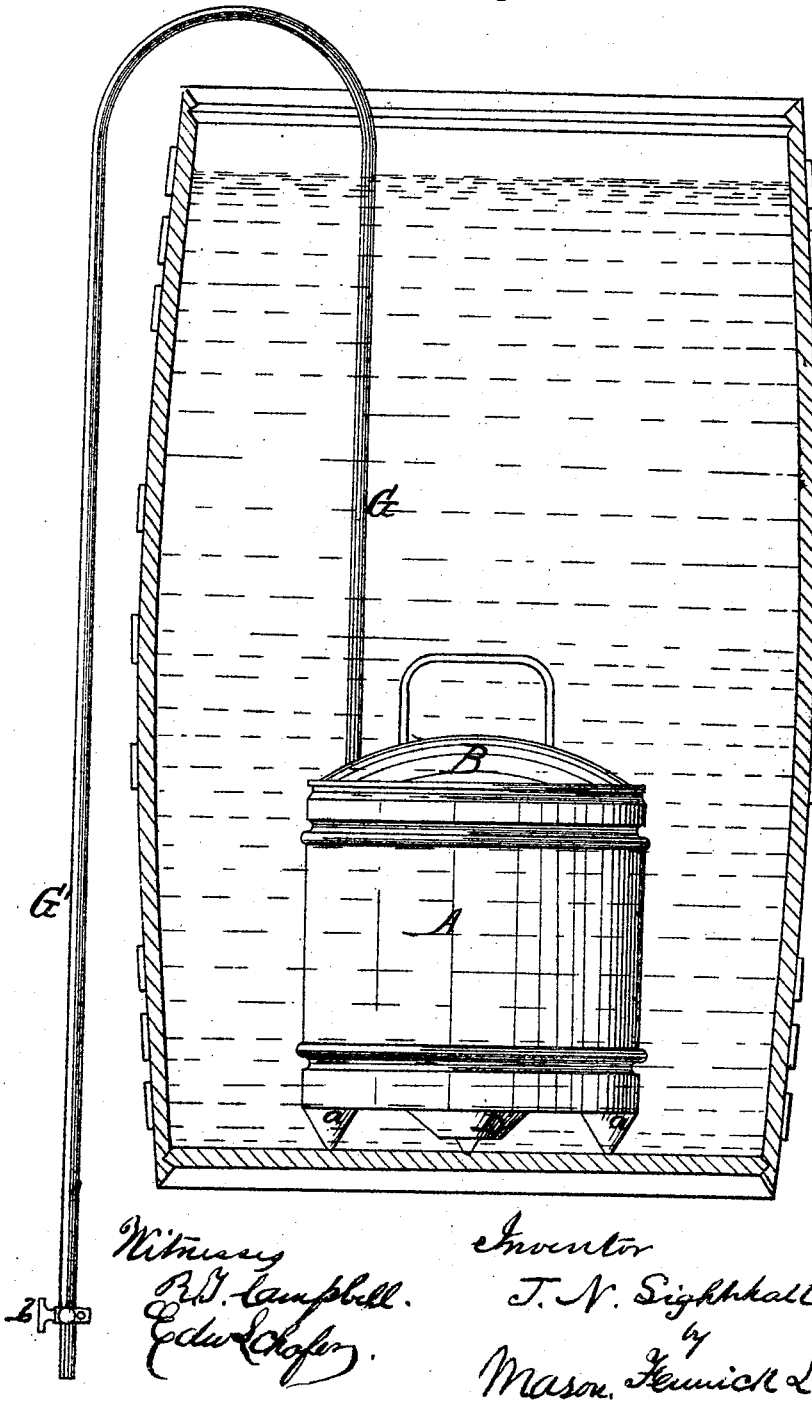

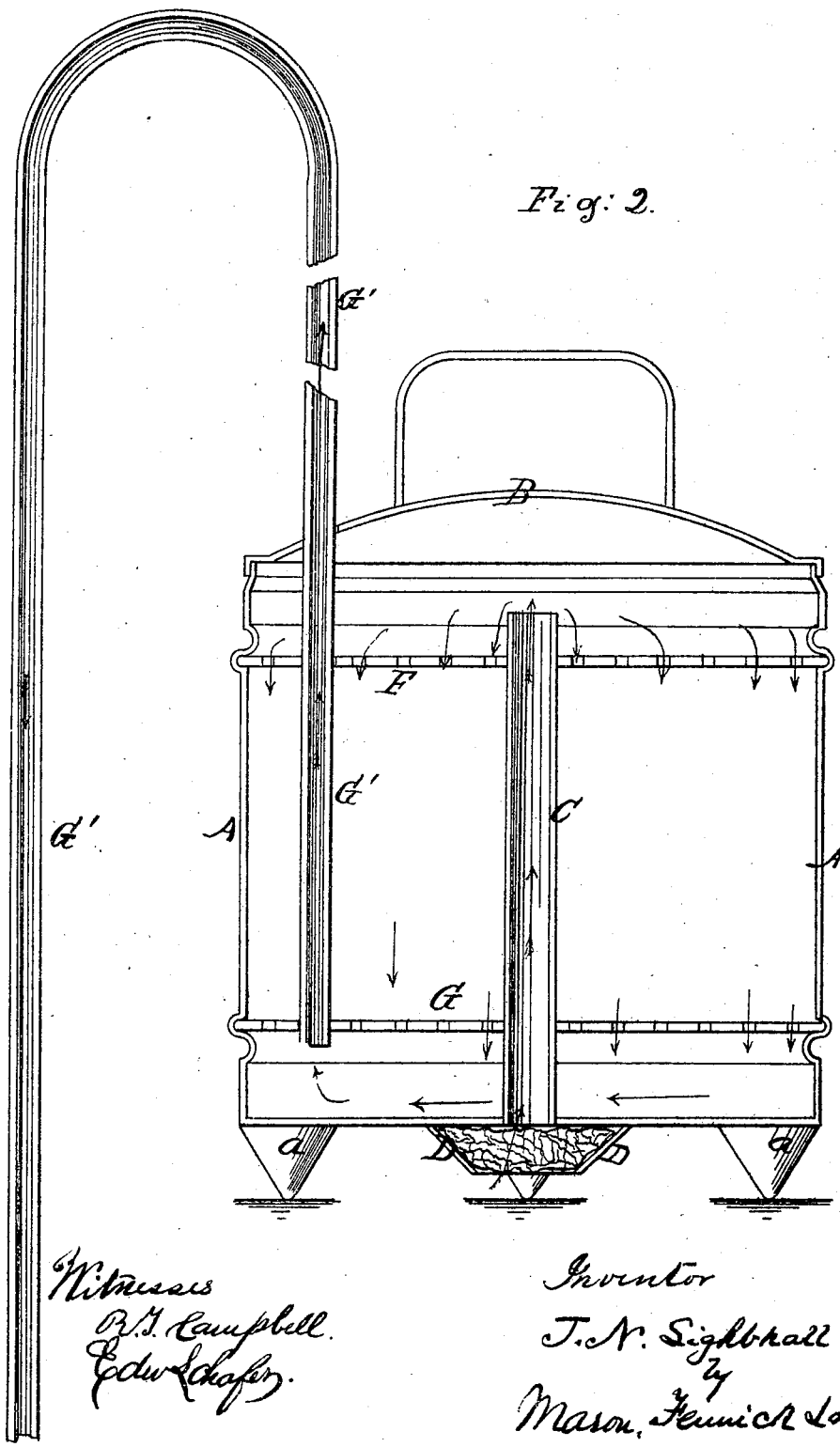

JOSEPH N. LIGHTHALL, OF JOLIET, ILLINOIS.

Letters Patent No. 73,105, dated January 7, 1868.

IMPROVEMENT IN FILTERS.

The Schedule referred to in these Letters Patent and making part of the same.

TO ALL WHOM IT MAY CONCERN:

Be it known that I, JOSEPH N. LIGHTHALL, of Joliet, in the county of Will, and State of Illinois, have invented a new and improved Portable Filter; and I do hereby declare that the following is a full, clear, and exact description thereof, reference being had to the accompanying drawings, making a part of this specification, in which—

Figure 1 is a sectional view of a barrel having my improved filter applied within it.

Figure 2 is a diametrical section through the improved filter, showing its interior construction.

Similar letters of reference indicate corresponding parts in both figures.

The object of this invention is to obtain a portable filter, which is so constructed that it can be placed within any vessel containing water or other liquid, which it is desired to draw off pure, or removed from such vessel at pleasure. Also, to so construct the filter that the sediment contained in the liquid drawn through it shall be left at the top or highest point of the filtering-medium, while the liquid enters at the lowest point thereof. Also, to prevent the rapid clogging up of the pores or capillary spaces of the main portion of the filtering-medium, by the employment of an auxiliary filtering-substance in a chamber at the bottom of the induction-pipe, to which chamber access can be readily had for removing and cleaning said substance at pleasure. And, finally, to construct this filter upon one end of a siphon or pipe leading from the bottom of the filtering-vessel through its top, all as will be hereinafter explained.

To enable others skilled in the art to understand my invention, I will describe its construction and operation.

In the accompanying drawings, A represents a cylindrical or other shaped vessel, which may be made of any suitable capacity, and which is mounted upon legs or standards a a, so that its bottom will be above the surface upon which the vessel rests. This vessel is constructed with a removable but tightly-fitting cover B, so that its contents can be removed and replaced at pleasure. It is also constructed with a central pipe, C, extending from the bottom of the vessel nearly to its top or cover, and communicating with an external chamber, D, at the bottom of the vessel. This pipe C is open at its top and bottom, and it is the only entrance allowed for the water to the interior of the vessel. The chamber D, at the lower end of the pipe C, is of the form of the frustum of a cone, with its base secured firmly to the bottom of the vessel A. In this chamber a piece of sponge or other suitable filtering-substance is introduced, the object of which is to prevent the passage of much solid sediment into the vessel. This piece of sponge will be firmly held in place in consequence of the peculiar form of its chamber, and it can be removed, at pleasure, for cleaning it, or substituting a new piece in its stead. Within the vessel A are two or more horizontal partitions, F G, which are thickly perforated, and which are designed to form chambers for the reception of different kinds of filtering-substances. The upper end of the pipe C is left clear, so that the water rising in it can flow freely over and percolate through the filtering-substance or substances, until it finally escapes through a pipe, G', which rises from a point near the bottom of vessel A, and passes out through the cover B, as shown in the drawings.

In fig. 1, I have represented the filter, above described, placed within a barrel, and supported upon the bottom thereof. In this case, the pipe G' is carried up to the top of the barrel, and brought down on its outside, in the form of a siphon. A cock, b, is applied to that leg of the siphon which extends below the barrel, for the purpose of stopping the flow of the liquid at pleasure.

It will be seen from the above description that the water in the barrel, in which the filter is submerged, rises through pipe C, then descends through the filtering-media, and escapes through the siphon G'.

Having described my invention, what I claim as new, and desire to secure by Letters Patent, is—

A filter, consisting of a vessel, A, provided with a central inlet-pipe, C, a removable cover, B, perforated partitions F G, and an outlet-pipe, G', substantially as described.

JOSEPH N. LIGHTHALL.

Witnesses:
MARTIN J. RUSSELL,
W. W. PERKINS.